ёё

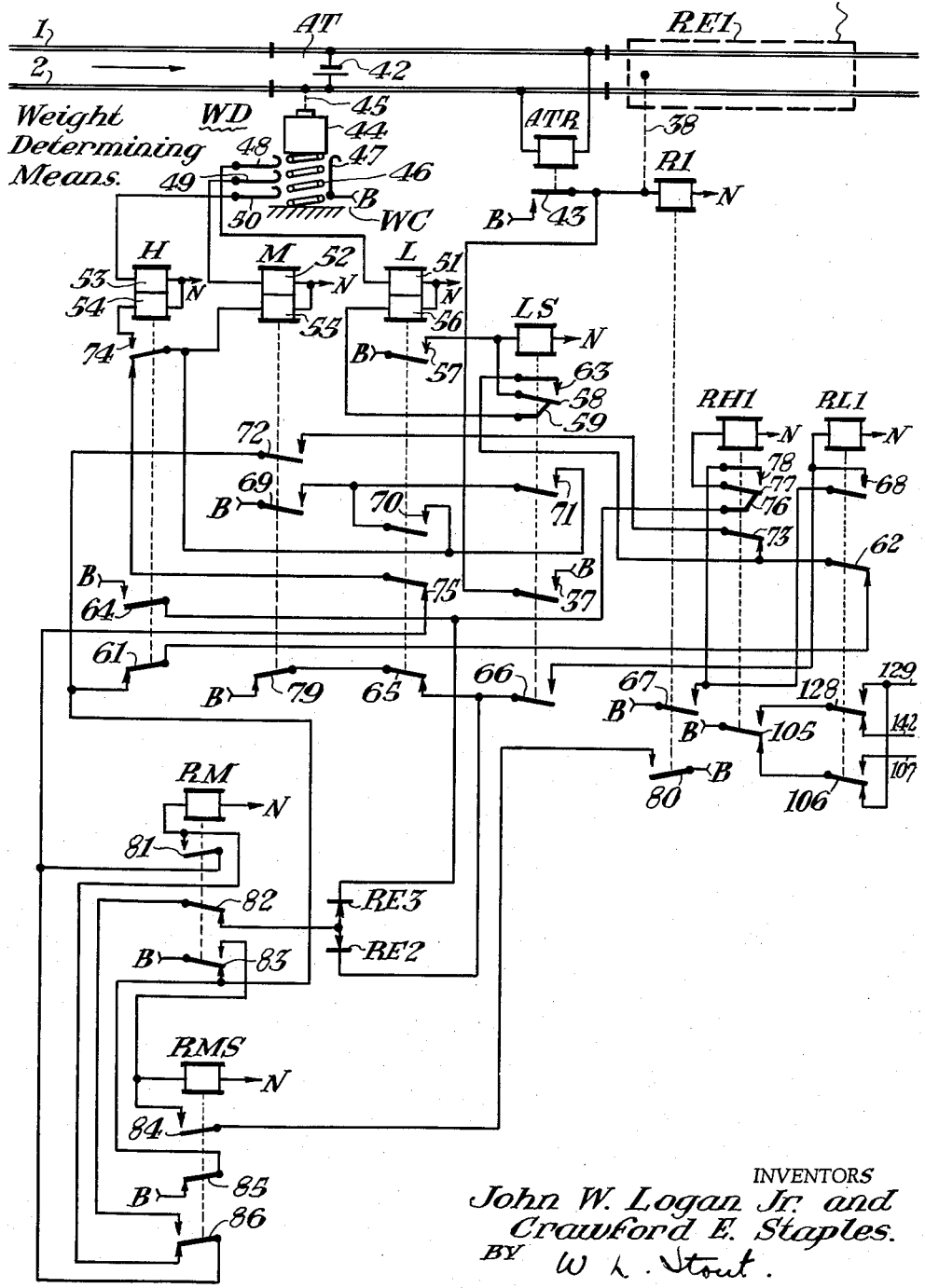

United States Patent Office 2,976,407
Patented Mar. 21, 1961

2,976,407

RAILWAY CAR WEIGHT REGISTRY APPARATUS

John W. Logan, Jr., Forest Hills, and Crawford E. Staples, Homewood, Pa., assignors to Westinghouse Air Brake Company, Wilmerding, Pa., a corporation of Pennsylvania Filed May 29, 1959, Ser. No. 816,890

9 Claims. (Cl. 246—182)

Our invention relates to railway car weight registry apparatus, and more particularly to an improved railway car weight registry means for use in the automatic control of car retarder speed control apparatus.

One of the commonly used arrangements for registering the weight of cars in car retarder speed control systems employs three weight classifications namely, light, medium, or heavy, and each car approaching a retarder is classified under one of these three weight classifications. In one well known weight registry arrangement the weight of a car on one wheel of each axle is determined by a weight responsive device or weighing device provided in one rail of a section of track and, if the weight on each of the weighed wheels of the car is determined as heavy, the car is classified as heavy and so registered. Similarly, if each of the said weighed wheels falls within the light weight classification, as determined by the weighing device, the car is classified and registered as light. However, if the weight on a single weighed wheel is determined as medium weight, or if one weighed wheel falls within the light weight classification and another weighed wheel falls within the heavy weight classification, the car is classified as medium and registered under that classification. One such weight registration system of the type described is shown and described in Letters Patent of the United States, No. 2,819,682, granted January 14, 1958, to Edward C. Falkowski for Car Retarder Speed Control Apparatus, which patent is assigned to the assignee of the present application.

In weight determining arrangements employing wheel weighing devices it has been found that one wheel of a car may fail to actuate the weighing device properly, resulting in a weight determination for that wheel which is incorrect. For example, a light or heavy wheel may be registered as medium rather than its proper weight. Such incorrect actuation of the weighing device may occur, for example, due to a flat spot on the weighed wheel causing the wheel to bounce just prior to, or while passing over the weighing device. Such malfunctioning of the weighing device can cause the classification of the car to be improperly registered as medium weight, rather than light or heavy weight, and can result in the "nose-diving" or "squeeze-out" of the car in the retarder if it should have been registered as light weight, or in excessive speed of the car if it should have been registered as heavy weight.

Accordingly, it is an object of our invention to provide improved railway car weight registry means, for use in automatic control of car retarder speed control apparatus, in which the determination of the weight on a single wheel of a car as medium will not result in the registration of the car as being of medium weight. That is to say, before a car will be registered as a medium weight car, the determination of the weight on at least two wheels must be medium.

A further object of our invention is to provide means to substantially reduce the "nose-diving" or excessive speed of cars in a car retarder due to the improper weight registry of the cars.

Still another object of our invention is to provide improved railway car weight registry means for use in conjunction with automatic car retarder speed control apparatus.

Other objects, advantages, and characteristic features of our invention will become apparent as the description proceeds.

We shall describe one form of apparatus embodying our invention, and shall then point out the novel features thereof in claims.

In the drawing, the reference characters 1 and 2 designate the rails of a stretch of track over which railway cars move by gravity in the direction indicated by the arrow into a car retarder section designated RE1. This retarder section is shown by a dotted line rectangle since it forms no part of our present invention but is included in the drawing merely to make the specification complete. The stretch of track illustrated in the drawing includes an insulated track section AT in the approach to the entrance of the retarder section RE1. This track section AT may be of any suitable length and is provided with a track circuit, including a track battery 42 and a track relay ATR. The parts of this track circuit are so proportioned that the relay ATR is normally picked up but will become released, in the manner well known in the art, when at least one pair of wheels and axle of a car occupy any part of the insulated track section.

An occupancy relay designated R1 is used to detect the occupancy of retarder section RE1. This relay may be controlled in any suitable manner, such for example as by track circuits provided for retarder section RE1. These track circuits are not shown in the drawing, and the control of relay R1 is shown conventionally because the specific circuit arrangement by which the relay detects the occupancy of the retarder section forms no part of our present invention. The control of relay R1 by a railway car traversing section RE1 is indicated by a dotted line 38, and it is sufficient for purposes of this description to point out that relay R1 is normally released and is picked up in the manner well known in the art, when at least one pair of wheels and axle of a railway car is present in the aforesaid track circuits provided for retarder section RE1. Relay R1 is also provided with additional pickup circuits which will be discussed later in this description.

The car weight determining means employed in the apparatus of our invention is designated by the reference character WD and includes a wheel weight responsive device WC and a group of three recording or registry relays L, M and H. The weight responsive device WC includes a movable circuit contactor 44 and a series of stationary contacts designated 47, 48, 49 and 50. The weight determining means is not a part of our present invention and no claim thereto is made in this application. However, this weight determining means may be similar to that shown and described in the copending application for Letters Patent of the United States Serial No. 493,228, filed March 9, 1955, by Herbert L. Bone (now deceased), for Vehicle Weight Controllers, which application is of common ownership with the present application. For the purpose of a better understanding of our invention it is considered expedient to briefly describe the operation of the weight determining means.

The circuit contactor 44 of the weight responsive device WC is actuated by suitable means, designated conventionally by the reference character 45, which means extend into a slot provided in the upper portion of a rail 2 of track section AT at a specific measuring point and cooperate with the rail so that depression of the portion of the rail above the slot will cause operation of the circuit contactor. Contactor 44 is normally biased by a spring 46 to an upper position, as shown in the drawing, and is moved downward against the force of spring 46 only when a car wheel is passing over the measuring point in rail 2. When contactor 44 is moved downward it successively closes circuits between stationary contact 47 and stationary contacts 48, 49, and 50 as hereinafter described in detail.

As previously set forth the railway cars traversing the track stretch shown in the drawing are classified into three weight classes, light, medium, or heavy. For example, cars weighing less than 40 tons may be classified as light, cars weighing between 40 and 60 tons may be classified as medium, and cars weighing over 60 tons may be classified as heavy. Device WC is proportioned and adjusted for movable contactor 44 to be depressed downward only sufficiently to close a circuit between contacts 47 and 48 in response to the passage of a light wheel over the measuring point, to be sufficiently depressed to close an additional circuit between contacts 47 and 49 in response to the passage of a medium wheel, and to close another additional circuit between contacts 47 and 50 when a heavy wheel traverses rail 2 at the proper point.

It should be pointed out at this time that a suitable source of current is provided, this current source being preferably a battery of proper voltage and capacity, but for the sake of simplicity this current source is not shown in the drawing, its positive and negative terminals being identified by the conventional reference characters B and N, respectively.

The registry relays L, M and H may be of any one of several types but are here shown as quick acting direct current neutral relays having two windings, the upper windings 51, 52 and 53 of these relays being employed as pickup windings, and the lower windings 54, 55, and 56 being employed as stick windings. The pickup circuit for relay L extends from terminal B of the battery through contact 47 of device WC, contactor 44, contact 48, and the pickup winding 51 of relay L to terminal N of the battery. The pickup circuit for relay M may be traced from terminal B of the battery through contact 47, contactor 44, contact 49, and the pickup winding 52 of relay M to terminal N of the battery. The pickup winding 53 of relay H is energized over a circuit extending from terminal B of the battery through contact 47, contactor 44, contact 50, and winding 53 to terminal N of the battery. Accordingly, when a wheel of any weight passes over the measuring point at which the contactor 44 is connected to rail 2, relay L is energized and picks up. If the wheel is a medium weight wheel realy M becomes picked up, and if the wheel is a heavy weight wheel relay H also becomes picked up. Thus, normally only relay L is picked up by the passing of a car wheel on a light weight car, relays L and M are picked up by the passage of a wheel on a medium weight car, and the three relays L, M and H are picked up by the passage of a wheel on a heavy weight car. When the wheel of a heavy car recedes from the point of measurement, the contacts 47—50, 47—49, and 47—48 open in the order named and, unless circuits to the stick windings of the relays are closed in a manner to be hereinafter described, relays H, M and L successively release in that order. Similar action of the weight determining means WD is repeated for each pair of wheels of a car or a multiple car cut.

A transfer relay designated by the reference character LS, a set of storage relays RH1 and RL1, two auxiliary storage relays RM and RMS, and two asymmetric units RE2 and RE3, which are employed to prevent sneak circuits, are also shown in the drawing. These relays are all suitable direct current neutral relays, relays LS and RH1 each being equipped with continuity transfer contacts of well-known construction shown in the drawing in a conventional manner.

In describing the operation of the apparatus as a whole we shall describe certain specific examples of the movements of cars of the different weight classifications over the weight determining means.

Under normal conditions, that is, when no cars are moving over the track stretch shown in the drawing all of the above described relays, with the exception of track relay ATR, are deenergized and in their released condition.

Assuming now that a light weight car approaches track section AT and its leading pair of wheels subsequently enters said section, thereby releasing track relay ATR, relay R1 is energized by an obvious circuit including back contact 43 of relay ATR and relay R1 therefore picks up. When the leading pair of wheels move over the weight measuring point the pickup circuit for relay L including contacts 47 and 48 is closed, and this relay therefore becomes energized over its pickup circuit and is subsequently held energized by its stick winding 56 being supplied with current through its own front contact 57 and continuity transfer back contact 58—59 of relay LS. As soon as relay L picks up, relay LS becomes picked up over an obvious pickup circuit including front contact 57 of relay L, and is then retained energized by a multiple stick circuit extending from battery terminal B through the back point of contact 83 of relay RM in multiple with back contact 85 of relay RMS, and thence through back contact 61 of relay H, back contact 62 of relay RL1, continuity transfer front contact 58—63 of relay LS, and the winding of relay LS to terminal N of the battery. When the leading pair of wheels recedes from the measuring point, relay L is released because its pickup and stick circuits are then both open, the stick circuit having been opened at contact 58—59 of relay LS when that relay picked up. At this time storage relay RL1 is energized over a pickup circuit which may be traced from battery terminal B through back contacts 79 and 65 of relays M and L, respectively, front contact 66 of relay LS, and the winding of relay RL1 to terminal N of the battery. With relay RL1 picked up, it is retained energized over an obvious stick circuit including front contact 67 of relay R1 and its own front contact 68. Thus the weight information for the weighed leading wheel of the light weight car is stored by relay RL1 until the car has passed through the approach track section AT and the retarder section RE1, and occupancy relay R1 is thereafter released. It is to be noted that relay R1 may be energized over an auxiliary circuit including front contact 37 of relay LS. This auxiliary circuit permits the connection 45 of the weighing device WC to be attached to the rail in approach to track section AT, or the section AT and its associated track relay entirely omitted, such arrangements being desirable in some instances. The above described pickup of storage relay RL1 opens at its back contact 62 the previously traced stick circuit for relay LS which releases. Relays L and LS are now reset for operation by the next wheel of the light weight car to traverse the measuring point. As will be explained later, once the light weight information is stored at relay RL1, further operation of relays L and LS serves to check whether the weights registered for the remaining wheels on the measuring point side of the light weight car fall in the light weight classification, and under some conditions to change the stored information when a different weight is registered.

Assuming next that a heavy weight car approaches and its leading pair of wheels enters section AT and passes the weight measuring point, relay R1 is first picked up as previously described, and then registry relays L, M and H are picked up in sequence over their previously described pickup circuits. Relay L is first picked up, and then relay LS is picked up in the identical manner described for the light weight car. When relay M becomes energized, it is subsequently retained energized by current supplied to its stick winding 55 over a multiple circuit which extends from terminal B of the battery through front contact 69 of relay M, front contact 70 of relay L and front contact 71 of relay LS in multiple, and winding 55 of relay M to terminal N of the battery. At this time a multiple stick circuit is completed for relay LS which may be traced from terminal B of the battery through the back point of contact 83 of relay RM in multiple with back contact 85 of relay RMS, front contact 72 of relay M, back contact 73 of relay RH1, continuity transfer front contact 58—63 of relay LS, and the winding of relay LS to terminal N of the battery. This last traced stick circuit is at this time in multiple with the stick circuit for relay LS previously described when a light weight car operated the weighing device. With still further actuation of the weighing device, relay H becomes energized by current supplied to its pickup winding 53 over its previously described pickup circuit. Relay H picks up and is retained energized by current supplied to its stick winding 54 by a circuit which may be traced from terminal B of the battery through front contact 69 of relay M, front contacts 70 and 71 of relays L and LS, respectively, in multiple, the front point of contact 74 of relay H, and winding 54 of relay H to terminal N of the battery.

The picking up of relay H closes an obvious pickup circuit for relay RH1 including front contact 64 of relay H and continuity transfer back contact 76—77 of relay RH1. Relay RH1 thereupon becomes picked up and completes its stick circuit which extends from terminal B of the battery over front contact 67 of relay R1, continuity transfer front contact 77—78 of relay RH1, and the winding of relay RH1 to terminal N of the battery. The picking up of relays H and RH1 opens at back contacts 61 and 73, respectively, the previously traced stick circuits for relay LS, but relay LS is retained energized at this time by its pickup circuit over front contact 57 of relay L.

As the weighed leading wheel of the heavy weight car recedes from the point of measurement, relays H and M are retained picked up over their previously described stick circuits. However, when the pickup circuit for relay L is opened by the car wheel receding from the point of measurement relay L releases and, in turn, opens the pickup circuit for relay LS which also releases. The opening of front contact 71 of relay LS completes the opening of the stick circuits for relays H and M and these relays also release. The apparatus is now reset for registration of the weight on the next pair of wheels of the heavy car. Similarly as for a light car and, as will be described later in this description, once the heavy weight wheel information is stored by the energization of relay RH1, operation of the registry relays by the remaining wheels on the measuring point side of the heavy weight car serves to check the weight registered and at times to change the stored information when there is a change in the registered weight.

Before describing the operation of the weight registry apparatus for a medium weight car moving over the weight determining means it is believed that it will be expedient to briefly discuss the operation of the apparatus for an unevenly loaded single car cut where the weights on the different axles of the car fall into light and heavy weight classifications. As previously pointed out any such combinations of weight registry result in the car being classified as medium weight, and as in the aforesaid Falkowski patent both relays RL1 and RH1 are picked up to indicate that a car comes under the medium weight classification.

Inasmuch as the determination of the weight on one weighed wheel of a car as light while the remainder of the weighed wheels are registered as heavy, or the determination of the weight on one weighed wheel of a car as heavy while the remainder of the weighed wheels are registered as light makes no difference in the weight classification of the car, the weight of the car being classified as medium in both instances, it will now be assumed that the leading wheel of an unevenly loaded car traversing the measuring point actuates the weighing means to indicate heavy and the following wheels traversing the measuring point actuates the weighing means to indicate light.

While the leading wheel of the unevenly loaded car is traversing the measuring point the apparatus operates in the identical manner as for the leading wheel of the heavy car previously described and relay RH1 is, therefore, picked up and retained picked up by its stick circuit including front contact 67 of relay R1 and continuity transfer front contact 77—78 of relay RH1, and the weight determining means is reset for the following wheel. When the following wheel passes over the measuring point, relay L is picked up over its previously described pickup circuit, thereby picking up relay LS over its pickup circuit including front contact 57 of relay L. The picking up of relay LS completes the previously described stick circuit for that relay including back contacts 61 and 62 of relays H and RL respectively. When the second wheel recedes from the measuring point relay L releases and opens the pickup circuit for relay LS. However, relay LS is momentarily retained energized by its stick circuit. The release of relay L also closes at its back contact 65 the previously described pickup circuit for relay RL1 including front contact 66 of relay LS. Relay RL1, therefore, becomes picked up at this time and completes its previously described stick circuit including its own front contact 68 and front contact 67 of relay R1. The picking up of relay RL1 opens at its back contact 62 the stick circuit for relay LS which is then released. Relay RL1 is thus stuck up, and relay LS is released to reset the weight determining means for the next wheel of the car to traverse the measuring point. However, as previously pointed out, the picking up of both relays RH1 and RL1 classifies the car which caused them to pick up as medium weight and the subsequent operation of the weight determining means by following car wheels will have no effect on the weight classification of the unevenly loaded car.

We will now discuss the operation of relays RM and RMS and associated control circuits, the addition of which to the structure disclosed in the aforementioned Falkowski Patent No. 2,819,682, and the improved operation resulting therefrom, comprises our invention.

When the leading pair of wheels of a medium weight car enters section AT and traverses the measuring point, the occupancy relay R1 is first picked up as previously described, and registry relays L and M are energized by current supplied to their pickup windings in the same manner as previously described for the heavy weight car. However, relay H at this time remains released. The circuit operation for energizing transfer relay LS and the closing of the stick circuits for relays L, LS and M are similar to that described for the heavy weight car except the alternate stick circuit for relay LS including back contact 73 of relay RH1 remains closed at this time. Therefore relay LS is retained energized over its stick circuit including back contact 73 of relay RH1 and front contact 72 of relay M, or over its stick circuit including back contact 62 of relay RL1 and back contact 61 of relay H, until relays RM and RMS open the stick circuits at their back contacts 83 and 85, respectively.

As the leading wheel of the medium weight car recedes from the weighing device and relay L is released as previously described, a pickup circuit for relay RM is completed. This circuit may be traced from terminal B of the battery through front contact 69 of relay M, front contact 71 of relay LS, the back point of contact 74 of relay H, back contact 75 of relay L, the back point of contact 86 of relay RMS, and the winding of relay RM to terminal N of the battery. The picking up of relay RM closes an obvious pickup circuit for relay RMS including the front point of contact 83 of relay RM. Relay RMS is thus also picked up at this time. The stick circuit for relay RM including its own front contact 81 insures that relay RM remains picked up when its pickup circuit is opened at the back point of contact 86 of relay RMS by the pickup of that relay.

The picking up of relays RM and RMS opens the previously described stick circuits for relay LS, which relay now releases. The release of relay LS opens at its front contact 71 the stick circuits for relays RM and M, both of which now release. The release of relay RM opens at the front point of its contact 83 the pickup circuit for relay RMS. However, when relay RMS picked up as described above, it completed a stick circuit extending from terminal B of the battery through front contact 80 of relay R1, front contact 84 of relay RMS, and the winding of relay RMS to terminal N of the battery. Relay RMS, therefore, remains picked up at this time to temporarily store a determination of medium weight on one wheel of the medium weight car. All of the relays except relays RMS and R1 are now released and reset for operation by the following wheel. It should be pointed out that neither relay RL1 or RH1 was picked up during the described operation of the relays for the weighed wheel of the leading pair of wheels of the medium weight car.

It will now be assumed that the following wheel of the medium weight car traverses the measuring point, picking up relays L, LS and M as before. At this time the stick circuits for relay LS are open at back contact 85 of relay RMS but are closed at the back point of contact 83 of relay RM. Relays L, LS and M therefore operate as for the weight determination of the leading wheel of the car. However, as the second wheel recedes from the measuring point and relay L is released as previously described, pickup circuits for relays RL1 and RH1 are completed rather than the pickup circuit for relay RM. The pickup circuit for relay RL1 may be traced from terminal B of the battery through front contact 69 of relay M, front contact 71 of relay LS, the back point of contact 74 of relay H, back contact 75 of relay L, the front point of contact 86 of relay RMS, back contact 82 of relay RM, asymmetric unit RE2, front contact 66 of relay LS, and the winding of relay RL1 to terminal N of the battery. The pickup circuit for relay RH1 may be similarly traced to the asymmetric units RE2 and RE3 but at this point the circuit extends through unit RE3, continuity transfer back contact 76—77 of relay RH1, and the winding of relay RH1 to terminal N of the battery. Relays RL1 and RH1 thus now pick up and complete their stick circuits including front contact 67 of relay R1. The picking up of relays RH1 and RL1 opens at back contacts 73 and 62, respectively, the stick circuits for relay LS and that relay now releases. The apparatus is now again reset for determining the weight on the remaining wheels of the car but no change in the medium weight registry can be made thereafter. When the car has proceeded sufficiently past retarder section RE1, relay R1 releases thereby releasing relays RMS, RL1 and RH1. The apparatus is therefore returned to its normal standby condition prepared to register the weight of the next car or cut of cars.

It should be pointed out that with the apparatus constructed in the manner heretofore described, relays RL1 and RH1 are energized in three different combinations for light, medium, or heavy cars, as in the previously identified Falkowski patent. That is to say, relay RL1 is energized and relay RH1 is deenergized for light weight cars, relay RH1 is energized and relay RL1 is deenergized for heavy weight cars, and both relays are energized for medium weight cars. Also as in the Falkowski patent, a combination of at least one heavy and one light wheel of a car will cause both relays RL1 and RH1 to become energized and thereby classify the car as of the medium weight classification. However, in the modification of our invention shown and described herein, registration of medium weight on only one pair of wheels of a car does not result in a medium weight classification for the car but the weight on at least two pairs of wheels of the car must be registered as medium before the car is classified as medium weight. Thus the classification of a car which would otherwise be classified as light or heavy will not be changed to medium by a single medium weight determination as in the Falkowski patent, but two such determinations must be registered before the car's classification is changed to medium.

For the purpose of describing that two registrations of medium weight must be made before the classification of a car is changed it will again be assumed that an unevenly loaded car approaches and enters track section AT. It will be further assumed that the first two wheels on one side of the car indicate heavy and the next two indicate medium. During the passage of the first two wheels the apparatus operates in the same manner as previously described for the heavy weight car, and relay RH1 is therefore picked up and retained energized over its stick circuit including front contact 67 of relay R1. When the third wheel (the first medium weight wheel) passes over the measuring point, relays L, LS, and M are energized as before and retained energized by their previously described stick circuits except, at this time, the alternate stick circuit for relay LS including back contact 73 of relay RH1 is open at that contact. However, the stick circuit for relay LS including back contact 62 of relay RL1 is closed retaining relay LS energized. As the third wheel recedes from the measuring point and relay L releases, the previously described pickup and stick circuits for relays RM and RMS operate as described for the leading wheel of the medium weight car, relay LS releases, relays M and RM then release, and relay RMS sticks up over the previously described stick circuit. When the fourth wheel (second medium weight wheel on one side of the car) traverses the measuring point and recedes therefrom the previously described pickup circuit for relay RL1 including back contact 75 of relay L, the front point of contact 86 of relay RMS, back contact 82 of relay RM and asymmetric unit RE2 becomes closed, and relay RL1 becomes energized and sticks up over its previously described stick circuit. The picking up of relay RL1 opens at its back contact 62 the remaining stick circuit for relay LS, which now releases. The weight registry apparatus is thus again reset and a medium weight classification for the car is stored.

It is to be noted that back contact 79 of relay M prevents relay RL1 from picking up when a medium weight is registered. This forces the pickup circuit for relay RL1, for a medium weight classification, to be completed over the alternate circuit including the front point of contact 86 of relay RMS. It is also to be noted that the back point of contact 74 of relay H in the pickup circuit for relay RM prevents relay RM from picking up when relay M is retained energized during the period while a heavy weight wheel is receding from the measuring point.

It may be said that the apparatus of our invention operates to temporarily store a medium weight determination for a first wheel on one side of a car or cut indicating that weight (by relay RMS) and to transfer this storage to the permanent storage means (relays RL1 and RH1) when a second wheel on said one side of the car or cut is determined to also indicate medium weight.

By the preceding description the manner in which the apparatus of our invention operates for any combination of weights on pairs of light and medium weight wheels, or pairs of heavy and medium weight wheels, is believed readily understood. It is also apparent that an incorrect registration of the weight on a single pair of car wheels as medium, due for example to a flat wheel, does not operate to change the weight classification of a car, the important fact to note being that at least two medium weight registrations are required before the car will be classified as medium.

The energizing circuits shown in the drawing for conductors 129, 142, and 107 over contacts 105, 128 and 106 of relays RL1 and RH1 form no part of our present invention but are shown merely to make the specification complete. These circuits operate to transfer the weight classification of a car or cut of cars to the car retarder control apparatus and reference is made to the aforementioned Falkowski Patent No. 2,819,682 for a full description of the apparatus controlled by these circuits. The similarity between these circuits and the identical circuits shown in Fig. 1a of the Falkowski patent will be readily apparent.

From the foregoing description it is apparent that, with the arrangement of apparatus of our invention as shown in the drawing, means are provided for reducing the number of incorrect medium weight classifications of railway cars in car retarder speed control systems, and the arrangement employs a minimum amount of apparatus to accomplish such reduction.

While we have herein shown and described only one form of apparatus embodying our invention, it is to be understood that various changes and modifications may be made therein, within the scope of the appended claims, without departing from the spirit and scope of our invention.

Having thus described our invention, what we claim is:

1. A railway car weight registry system comprising, in combination, means for individually determining the weight on the wheels on one side of a car as being of light, medium, or heavy weight as the car traverses a stretch of track; first and second storage relays, means controlled by said weight determining means for picking up said first storage relay in response to a light weight determination, means controlled by said weight determining means for picking up said second storage relay in response to a heavy weight determination, first and second auxiliary relays, means controlled by said weight determining means in response to a first medium weight determination and by the second auxiliary relay in its released position for picking up the first auxiliary relay, means controlled by the first auxiliary relay in its picked up position and by said weight determining means in response to said first medium weight determination for retaining the first auxiliary relay picked up, means controlled by the first auxiliary relay for picking up the second auxiliary relay when the first auxiliary relay is picked up; and means controlled by said weight determining means in response to a second medium weight determination and by said second auxiliary relay in its picked up position and said first auxiliary relay in its released position for picking up both said storage relays to thereby store a medium weight determination.

2. A railway car weight registry system for a stretch of railway track, comprising, in combination, a weight determining device operating in response to the passage of car wheels to energize first and second storage relays respectively in accordance with first or third weight classification determinations of wheels of cars classifiable under first, second, and third weight classifications; third and fourth relays, means including a back contact of the fourth relay and said device operating in response to a first second weight classification determination for picking up said third relay, means including a front contact of said third relay and said device operating in response to said first second weight classification determination for retaining the third relay picked up, means including a front contact of the third relay for picking up the fourth relay, means including a front contact of the fourth relay and a contact closed in response to the passage of a car over the track stretch for retaining the fourth relay picked up; and means including said device operating in response to a second second weight classification determination, a back contact of the third relay, and a front contact of the fourth relay, for picking up both said storage relays.

3. A railway car weight registry system for a stretch of railway track, comprising, in combination, a weight determining device in said stretch, a first storage relay, means controlled by said device for energizing said first storage relay when said device responds to the first of three car weight classifications, a second storage relay, means controlled by said device for energizing said second storage relay when the device responds to the third of said weight classifications, a third and a fourth relay, means controlled by said device and the fourth relay for energizing the third relay when and only when the device responds to a first determination of the second of the weight classifications and the fourth relay is deenergized, means controlled by said device and a front contact of the third relay for maintaining the third relay energized so long as the device responds to said first determination of the second of the weight classifications, means controlled by the third relay for energizing the fourth relay when and only when the third relay is energized, means controlled by a contact closed in response to a car in said track stretch and a front contact of the fourth relay for maintaining the fourth relay energized; and means controlled by said device, a back contact of the third relay, and a front contact of the fourth relay for energizing both said storage relays when the device responds to a second determination of the second of the weight classifications.

4. In a car weight registry system for a stretch of railway track provided with railway car wheel weight determining means, and including a first storage relay picked up when the weight on a wheel of a car is determined by said means to be a light weight and a second storage relay picked up when the weight on a wheel of a car is determined by said means to be a heavy weight; in combination, first and second auxiliary relays, means controlled by said weight determining means and the second auxiliary relay for picking up the first auxiliary relay when and only when the weight determining means determines the weight on a car wheel as being medium weight and the second auxiliary relay is released, means controlled by said weight determining means and a contact of the first auxiliary relay for retaining the first auxiliary relay picked up when once picked up and so long as the weight determining means continues to determine the weight on said car wheel as being medium weight, means controlled by the first auxiliary relay for picking up the second auxiliary relay when and only when the first auxiliary relay is picked up, track occupancy detection means for said track stretch, means controlled by said track occupancy detection means and a contact of the second auxiliary relay for retaining the second auxiliary relay picked up when once picked up and so long as the track occupancy detection means detect a condition of track occupancy, and means controlled by said weight determining means and the auxiliary relays for picking up both said storage relays when the weight determining means determines the weight on a car wheel as being medium weight and the first auxiliary relay is released and the second auxiliary relay is picked up.

5. In a car weight registry system for a stretch of railway track provided with a car wheel weight determining device operable progressively through first, second, and third positions to progressively pick up first, second, and third registry relays respectively according as a light, medium, or heavy car wheel traverses the device, and including first and second storage relays picked up in response to the passage of a light or heavy car wheel respectively over said device; in combination, first and second auxiliary relays, a pickup circuit for the first auxiliary relay including a front contact of the second registry relay and a back contact of the second auxiliary relay, a stick circuit for the first auxiliary relay including its own front contact and said front contact of the second registry relay, a pickup circuit for the second auxiliary relay including a front contact of the first auxiliary relay, track occupancy detection means for said track stretch including a contact operable to first and second positions according as the track stretch is unoccupied or occupied respectively, a stick circuit for the second auxiliary relay including its own front contact and said contact of said detection means closed in its second position; and a pickup circuit for said storage relays including said front contact of the second registry relay, and a front and a back contact of the second and first auxiliary relays respectively.

6. In a car weight registry system for a stretch of railway track provided with a car wheel weight determining device operable progressively through first, second, and third positions to progressively pick up first, second, and third registry relays respectively according as a light, medium, or heavy car wheel traverses the device, and including first and second storage relays picked up in response to the passage of a light or heavy car wheel respectively over said device; in combination, first and second auxiliary relays, means including the second registry relay and the second auxiliary relay for picking up the first auxiliary relay when and only when the second registry relay is picked up and the second auxiliary relay is released, means including the second registry relay for maintaining the first auxiliary relay picked up when once picked up and the second registry relay remains picked up, means including the first auxiliary relay for picking up the second auxiliary relay when and only when the first auxiliary relay is picked up, track occupancy detection means for said track stretch, means including the track occupancy detection means for maintaining the second auxiliary relay picked up when once picked up and said detection means detect a condition of track occupancy, and means including the second registry relay and the auxiliary relays for picking up both storage relays when the second registry relay is picked up and the first and second auxiliary relays are released and picked up respectively.

7. A car weight registry system for a stretch of railway track, comprising, in combination, a railway car wheel weight determining device in said stretch, a first storage relay controlled by said device and picked up when the weight on the wheel of a car is determined by said device as being a light weight, a second storage relay controlled by said device and picked up when the weight on the wheel of a car is determined by said device as being a heavy weight, first and second auxiliary relays; a pickup circuit for the first auxiliary relay including a contact closed when said device determines the weight on a car wheel as being medium weight, and a back contact of the second auxiliary relay; a stick circuit for the first auxiliary relay including one of its own front contacts and said closed contact, a pickup circuit for the second auxiliary relay including a front contact of the first auxiliary relay, a track occupancy detection device for said track stretch including a contact closed when the stretch is occupied, a stick circuit for the second auxiliary relay including one of its own front contacts and said closed contact of said detection device; and a pickup circuit for said storage relays including said first mentioned closed contact, a front contact of the second auxiliary relay, and a back contact of the first auxiliary relay.

8. In combination with a stretch of railway track provided with car weight determining means operable to first, second, and third contact closing positions in response to a first, second, and third car weight respectively; first and second normally deenergized storage relays, pickup circuit means including contacts closed in said first and third positions respectively of the weight determining means with connections to the storage relays to energize only the first storage relay in response to said first car weight and only the second storage relay in response to said third car weight, first and second auxiliary relays, pickup circuit means including a contact closed in said second position of the weight determining means and a back contact of the second auxiliary relay with connections to the first auxiliary relay to energize that relay in response to a first determination of said second car weight, stick circuit means for the first auxiliary relay including one of its own front contacts and said contact closed in said second position of the weight determining means, pickup circuit means for the second auxiliary relay including a front contact of the first auxiliary relay, stick circuit means for the second auxiliary relay including a contact closed in response to a car occupying said track stretch, and pickup circuit means including said contact closed in said second position of the weight determining device and a front and a back contact of said second and first auxiliary relays respectively with connections to the storage relays to energize both storage relays in response to a second determination of said second car weight.

9. In a railway car weight registry system for a stretch of railway track provided with a weighing device operating in response to the passage of railway car wheels to energize first or second storage relays according as the device indicates light or heavy weight classifications respectively of possible light, medium, or heavy weight classification; in combination, first and second auxiliary relays, a pickup circuit for the first auxiliary relay including a back contact of the second auxiliary relay and a contact closed when said weighing device responds to the passage of a medium weight car wheel, a stick circuit for the first auxiliary relay including said closed contact of said device, a pickup circuit for the second auxiliary relay including a front contact of the first auxiliary relay, a stick circuit for the second auxiliary relay including a contact closed in response to the occupancy of said track stretch by a car; and a pickup circuit for both storage relays including said contact closed when the device responds to the passage of a medium weight car wheel, and a front and back contact of the second and first auxiliary relays respectively.

No references cited.